United States Patent [19]

Blytas

[11] Patent Number: 4,536,382

[45] Date of Patent: Aug. 20, 1985

[54] PROCESS FOR THE CONVERSION OF $H_2S$ AND ADJUSTMENT OF THE $H_2/CO$ RATIO IN GASEOUS STREAMS CONTAINING HYDROGEN SULFIDE, HYDROGEN, AND CARBON MONOXIDE

[75] Inventor: George C. Blytas, Houston, Tex.

[73] Assignee: Shell Oil Company, Houston, Tex.

[21] Appl. No.: 563,479

[22] Filed: Dec. 20, 1983

[51] Int. Cl.³ .................... C01B 31/20; C01B 3/16; B01D 53/34

[52] U.S. Cl. ................... 423/437; 423/226; 423/247; 423/243; 423/573 R; 423/655; 48/197 R; 252/373

[58] Field of Search .......... 423/226, 415 A, 437, 423/573 G, 573 R, 243, 648 R, 247, 655, 656; 48/197 R; 252/373

[56] References Cited

U.S. PATENT DOCUMENTS

| | | | |
|---|---|---|---|
| 3,933,993 | 1/1976 | Salemme | 423/226 |
| 3,989,811 | 11/1976 | Hill | 423/573 G |
| 4,009,251 | 2/1977 | Meuly | 423/573 |
| 4,085,192 | 4/1978 | Van Scoy | 423/226 |
| 4,100,257 | 7/1978 | Sartori et al. | 423/226 |
| 4,112,050 | 9/1978 | Sartori et al. | 423/223 |
| 4,112,051 | 9/1978 | Sartori et al. | 423/223 |
| 4,254,094 | 3/1981 | Hegarty | 423/220 X |
| 4,356,155 | 10/1982 | Blytas et al. | 423/226 |
| 4,409,199 | 10/1983 | Blytas | 423/226 X |

FOREIGN PATENT DOCUMENTS 729090  3/1966  Canada .................. 423/226

Primary Examiner—Earl C. Thomas
Attorney, Agent, or Firm—Albert J. Adamcik

[57] ABSTRACT

An integrated process for modifying the $H_2/CO$ ratio in specified gaseous streams is disclosed, the process being characterized by bulk removal of $H_2S$, adjustment of $H_2/CO$ ratio by water gas (or carbon monoxide) shift, and removal of remaining $H_2S$. $CO_2$ may be recovered, and the process may be operated to produce a gas comprising principally hydrogen.

7 Claims, 1 Drawing Figure

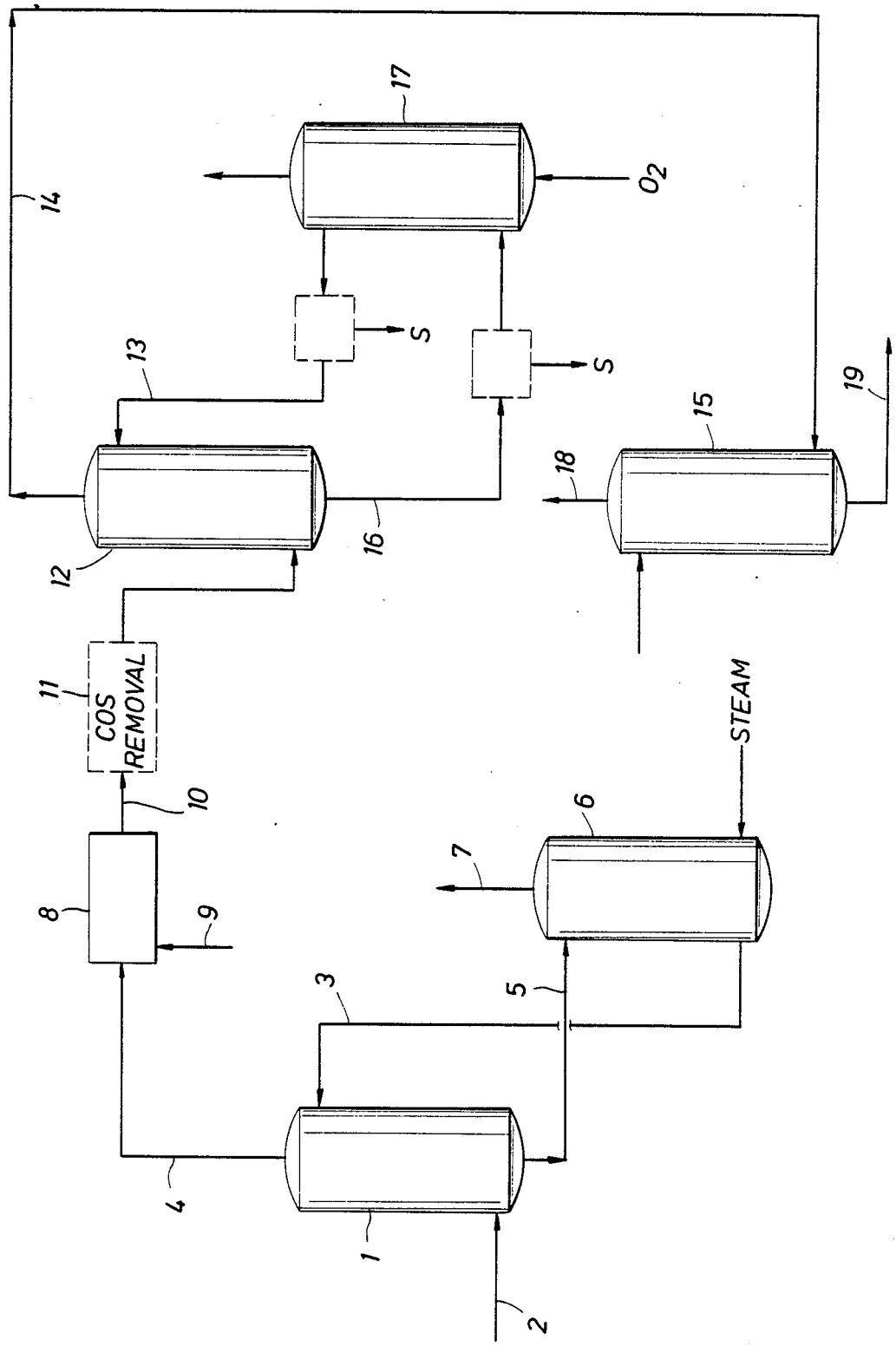

4,536,382

PROCESS FOR THE CONVERSION OF H₂S AND ADJUSTMENT OF THE H₂/CO RATIO IN GASEOUS STREAMS CONTAINING HYDROGEN SULFIDE, HYDROGEN, AND CARBON MONOXIDE

BACKGROUND OF THE INVENTION

A number of gasification processes in existence or being developed, e.g., gasification of coke, residues, coal, etc., produce synthesis gases having various quantities of $H_2$, $CO$, $CO_2$ and $H_2S$, as well as minor "impurity" components of $NH_3$ and $HCN$. In the case of gases derived from the gasification of coal, for example, the ratio of $CO$ to $H_2$ may range from 0.9 to 12:1, and the gas may contain from 0.05 percent to 10 percent by volume of $H_2S$. If the "syn-gas" is to be used for fuel purposes, the ratios mentioned are generally satisfactory, and little need be done except elimination of contaminants such as $H_2S$ and $HCN$.

On the other hand, if other uses for the synthesis gas are contemplated, such as hydrogen production or use as a feedstock for synthesis operations, the ratio of $H_2$ to $CO$ may become critical, and adjustment of the $H_2/CO$ ratio to the right range may require great expense. Accordingly, a process that provided a ready method of adjustment of the $H_2/CO$ ratio from such gases, even to the production of hydrogen alone, could have great economic importance. The invention relates to such a process.

SUMMARY OF THE INVENTION

Accordingly, the invention relates to a process comprising (a) contacting a gaseous stream containing $H_2$, $CO$, and $H_2S$ with an $H_2S$-selective absorbent in an absorption zone and absorbing the bulk of the $H_2S$ in said stream, producing a partially purified gas stream containing a minor portion of $H_2S$;

(b) contacting at least a portion of the partially purified gas stream with a water shift catalyst in a conversion under conditions to react $CO$ and water, and converting $CO$ and water to $H_2$ and $CO_2$, and producing a modified gas stream having an increased ratio of $H_2$ to $CO$ and a minor quantity of $H_2S$;

(c) passing modified gas stream to a contacting zone and contacting modified gas stream with an aqueous reactant solution, the solution containing an effective amount of an oxidizing polyvalent metal chelate of nitrilotriacetic acid, or mixtures of such chelates, and converting $H_2S$ in the modified gas stream in the contacting zone to sulfur, and recovering a substantially sulfur-free gas stream having an increased ratio of $H_2$ to $CO$. In an additional embodiment, the substantially sulfur-free gas stream having an increased ratio of $H_2$ to $CO$ is passed to an absorption zone which contains an absorbent selective for $CO_2$. Carbon dioxide is absorbed, and a gas stream having a high $H_2/CO$ ratio or comprising $H_2$ having a substantially reduced $CO_2$ content is produced. The invention thus provides an efficient method of producing a product stream containing a wide range of $H_2/CO$ compositions, ranging to the point of virtually pure hydrogen. Additionally, an optional embodiment provides for removal of minor quantities of COS, if present, in the streams.

DETAILED DESCRIPTION OF THE INVENTION

The source of the gaseous stream (containing $H_2$, $CO$, and $H_2S$) is not critical. Thus, the streams mentioned, i.e., streams derived from the gasification of coke, residues, coal, etc., are eminently suited to the invention. Other streams containing the components mentioned, and in which it is desired to adjust the ratio of $H_2$ to $CO$ and remove $H_2S$, may also be treated according to the invention, so long as other components therein do not substantially adversely affect the absorbents, catalysts, etc. employed herein. In this regard, if the absorbents chosen are sensitive to HCN, removal of this contaminant before the stream is treated according to the invention is preferred. For example, the stream may be treated as described in U.S. application Ser. No. 556,255 entitled Removal of HCN from Gaseous Streams, by Diaz, filed Nov. 29, 1983. Streams derived from the gasification and/or partial oxidation of gaseous or liquid hydrocarbon may be treated by the invention. The $H_2S$ content of the type of streams contemplated will vary extensively, but, in general, will range from about 0.05 percent to about 10 percent by volume. CO content may vary considerably, and may range from about 30 percent to over 80 percent by volume. $H_2$ content may also vary, but normally will range from about 10 percent to about 50 percent by volume. $CO_2$, of course, may be present. Obviously, the concentrations of $H_2S$, $CO$ and $H_2$ present are not generally a limiting factor in the practice of the invention. In some of the most economically attractive gasification processes, the $CO$ to $H_2$ volume ratio may be quite high, as mentioned previously.

In the first step of the process, the gas stream selected is contacted or mixed with an absorbent selective for $H_2S$ in a manner or under conditions that will absorb the bulk of the $H_2S$, preferably at least 80 percent by volume. Any of the known $H_2S$-selective absorbents conventionally used (or mixtures thereof) which do not react substantially with the other components of the gas stream, may be employed. Those skilled in the art will recognize that most $H_2$-selective absorbents tend to absorb $CO_2$, and if any of this gas is present, it will also be absorbed. Given these qualifications, the particular absorbent chosen is a matter of choice. Aqueous alkali metal carbonate and phosphate solutions, e.g., aqueous potassium and sodium carbonate and phosphate, carbitol (diethylene glycol monoethyl ether), and certain aqueous alkanolamines, such as alkyl diethanolamines, may be used. Suitable alkanolamines include methyldiethanolamine, triethanolamine, or one or more dipropanolamines, such as di-n-propanolamine or diisopropanolamine. Aqueous methyldiethanolamine, triethanolamine and dipropanolamine solutions are preferred absorbents, particularly methyldiethanolamine and diisopropanolamine solutions. The solutions may contain very minor amounts of physical solvents, such as substituted or unsubstituted tetra-methylene sulfones.

If diisopropanolamine is used, either high purity diisopropanolamine may be used, or technical mixtures of dipropanolamine such as are obtained as the by-product of diethanolamine production may be employed. Such technical mixtures normally consist of more than 90% by weight of diisopropanolamine and 10% by weight or less of mono- and tri-propanolamines and possibly trace amounts of diethanolamine. Concentrations of aqueous alkanolamine solutions may very widely, and those skilled in the art can adjust solution concentrations to achieve suitable absorption levels. In general, the concentration of alkanolamine in aqueous solutions will be from 5 to 60% by weight, and preferably between 25 to 50% by weight. If COS is present in the gas, it may be removed in the absorbent, or may be hydrolyzed, as described herein.

Suitable temperature and pressure relationships for different hydrogen sulfide-selective absorbents are known, or can be calculated by those skilled in the art. In general, the temperatures employed in the absorption zone are not critical, and a relatively wide range of temperatures, e.g., from 0° to 100° C. may be utilized. A range of from about 0° to 85° C. is preferred.

Similarly, pressure conditions in the absorption zone may vary widely, depending on the pressure of the gas to be treated. For example, pressures in the absorption zone may vary from one atmosphere up to 150 or even 200 atmospheres. Pressures of from 1 atmosphere to about 100 atmospheres are preferred. As indicated, what is required in the absorption zone is that the bulk of the $H_2S$, preferably at least 80 or 90 percent by volume, be absorbed. Given the solvents and parameters mentioned, those skilled in the art may adjust the conditions of operation to achieve this result. It is thus an advantage of the invention that all of the $H_2S$ need not be removed at this point.

The absorption step thus produces a "purified" gas stream which has most of the $H_2S$ removed, leaving a minor portion of $H_2S$, e.g., less than about 10 percent to 20 percent by volume $H_2S$ in the stream. The absorption liquid or solvent, being "loaded" or "semi-loaded", is preferably "regenerated" in suitable cyclic techniques, producing a stream rich in $H_2S$ and a "lean" absorbent which can be recycled for use in the absorption steps. Suitable techniques for these procedures are well known, and form no part of the present invention. See, for example, Canada Pat. No. 729,090, U.S. Pat. No. 3,989,811, and U.S. Pat. No. 4,085,192. Thus, in the regeneration or stripping zone, temperatures may be varied widely, the only requirement being that the temperatures be sufficient to reduce the $H_2S$ content in the absorbent to a level sufficient so that, when returned to the absorption zone, the absorbent will effectively absorb $H_2S$ from the gas to be treated. Preferably, the temperature should be sufficient to reduce the $H_2S$ content in the load absorbent to a level which corresponds to an equilibrium loading for an $H_2S$ content having less than 50 percent (preferably 10 percent) of the $H_2S$ content of the treated gas. Equilibrium loading conditions for $H_2S$ and $CO_2$ at varying concentrations, temperatures and pressures for different hydrogen sulfide-selective absorbents are known or can be calculated by known methods and hence need not be detailed herein. In general, temperatures of from about 90° C. to 180° C., preferably from 100° C. to 170° C., may be employed.

Similarly, in the regeneration or desorption zone, pressures will range from about 1 atmosphere to about 3 atmospheres. As noted, the pressure-temperature relationships involved are well understood by those skilled in the art, and need not be detailed herein. Contact times in the absorption zone, insofar as meaningful, will depend, inter alia, on the velocity of the gas stream treated, the absorbent employed, and the type of contactor employed. In a tray column, for example, contact time might usefully be described as the total time a given volume of gas is present in the given absorber, recognizing the gas liquid contact may not occur continuously in such a unit. Given these qualifications, "contact" times will normally range from 1 second to 30 seconds, preferably from 1 second to 20 seconds.

In sum, the conditions for the absorption and regeneration should be so specified that the bulk of the $H_2S$, preferably 80 to 90 percent and most preferably at least 95 percent, by volume, of the $H_2S$ in the gas is absorbed. Such conditions, including choice of solvents and, e.g., number of trays, if a tray contactor is used, will provide that very little $CO_2$ is absorbed. Any $CO_2$ or other gases absorbed will be released on regeneration, and are treated with the $H_2S$, e.g., in a Claus unit.

The partially "purified" gas is now passed to a conversion zone wherein it contacts water, preferably as vapor, in the presence of a catalyst for the reaction of water and CO, and under conditions suitable for the conversion. Since one mole of water reacts with one mole of CO to produce the hydrogen and $CO_2$, and since equilibrium is not easily reached, the volume of $H_2$ produced varies directly with the water and CO supplied. Suitable conditions, i.e., temperatures, pressures, contact times, catalysts, etc., are known to those skilled in the art. For example, Kirk-Othmer, Encyclopedia of Chemical Technology (2nd Edition), Volume 4, pages 431 and 432 (1967), the Catalyst Handbook, Chapter 6, (1970), and Catal. Rev.-Sci. Eng., Volume 21(2) pages 275–318 (1980) describe suitable conditions and catalysts for treating the purified stream. Appropriate catalysts include Fe/Cr for high temperature shift, and Cu/Zn for low temperature shift. The high temperature Fe-based supported catalysts have a higher sulfur tolerance that the Cu/Zn catalysts. However, the latter system, since it operates at low temperatures, can convert a higher proportion of CO and thus achieve a pronounced modification of the $CO/H_2$ ratio. This is possible because the equilibrium of the water-shift reaction $$CO + H_2O \rightarrow CO_2 + H_2$$

lies to the right at lower temperatures. As indicated, the ratio of $H_2/CO$ is adjusted to the extent desired by controlling the volume of water supplied to the conversion zone. Depending on the conditions applied and the volume of $H_2S$ remaining in the stream, at least some COS, if present, may be converted. Optionally, a COS conversion zone may be employed after the shift zone to remove any COS present in the stream. The hydrolysis of COS is shown by the following formula:

$$COS + H_2O \rightarrow H_2S + CO_2$$

Water is added, in the COS conversion zone, in the required amount. Any catalyst demonstrating activity for this reaction may be employed. Preferred catalysts are Ni, Pd, Pt, Co, Rh or In. In general, most of these materials will be provided as solids deposited on a suitable support material, preferred amorphous support materials being the aluminas, silica aluminas, and silica. Crystalline support materials such as the aluminosilicates, known as molecular sieves (zeolites), synthetic or natural, may also be used. The selection of the particular catalyst (and support, if employed) are within the skill of those working in the field. Platinum on alumina is preferred.

The temperatures employed in the optional hydrolysis zone are not critical, except in the sense that the temperatures employed will allow substantially complete conversion of the COS. Temperatures will range from about 50° C. to 150° C. or even 200° C., although a range of from about 50° C. to about 150° C. is preferred. Those skilled in the art may adjust the temperatures, as needed, to provide efficient reaction temperatures. Contact times will range from about 0.5 second to about 10 seconds, with contact times of 1 second to 3 seconds being preferred. Pressures employed in the hydrolysis zone may be atmospheric, below atmospheric, or greater than atmospheric. If higher temperatures and a high temperature catalyst are employed in the shift zone, the gas stream exiting the shift reactor or the optional COS hydrolysis zone should be passed through a heat exchange zone, the heat from the gas preferably being utilized to heat the gas stream entering the shift zone.

In accordance with the invention, the remainder of the $H_2S$ in the gas stream (and any $H_2S$ produced by hydrolysis) is removed by contacting the stream with a specific oxidizing reactant. The reactant materials are selected from the oxidizing polyvalent metal chelate or chelates of nitrilotriacetic acid. Any oxidizing polyvalent metal, or mixtures thereof, for the chelate compound may be used, but iron, copper and manganese are preferred, particularly iron. The polyvalent metal should be capable of oxidizing hydrogen sulfide, while being reduced itself from a higher to a lower valence state, and should then be oxidizable from the lower valence state to the higher valence state in a typical redox reaction. Other polyvalent metals which may be used include lead, mercury, palladium, platinum, tungsten, nickel, chromium, cobalt, vanadium, titanium, tantalum, zirconium, molybdenum, and tin. The FeIII chelate of nitrilotriacetic acid is preferred.

According to the invention, a substantially sulfur-free gas stream having an increased $H_2/CO$ ratio is recovered. The conditions of operation of the oxidative removal of the remainder of the $H_2S$ from the gas stream, sulfur recovery, and regeneration of the oxidizing reactant solution are adequately described in U.S. Pat. No. 4,409,199 (Blytas), issued Oct. 11, 1983, and U.S. Pat. No. 4,356,155 (Blytas and Diaz), issued Oct. 26, 1982, which disclosures are incorporated herein by reference.

The product produced, from this stage, will depend on the degree of conversion in the previous shift step. The gaseous stream is treated under appropriate conditions with an absorbent selective for $CO_2$ in the presence of $H_2$ or $H_2$ and CO. If the shift reaction has been utilized to adjust the $H_2/CO$ ratio to a given point, the product will be $H_2$ and CO, in the given ratio. On the other hand, if the CO is reacted to extinction, the gas stream product will be comprised predominantly of hydrogen. Those skilled in the art may select appropriate $CO_2$ selective absorbents, pressures, temperatures, etc., to separate the hydrogen/$CO_2$ or hydrogen/$CO_2$/CO mixtures. Suitable absorbents include aqueous alkanolamines, sodium or potassium carbonate solutions, tri-potassium phosphate, or solutions of sterically-hindered amines in aqueous or organic solvents, or in combinations of amines and potassium carbonate. Conditions for designing absorption and regeneration may be selected on the basis of the specific case considered. Characteristics of the aqueous alkanolamines, alkali metal carbonates, and potassium metaphosphate are well known, as described in *Gas Purification* by A. L. Kohl and F. C. Riesenfeld (1960). Use of sterically-hindered amines for $CO_2$ absorption is described in U.S. Pat. No. 4,112,050 (1978), U.S. Pat. No. 4,112,051 (1978), and U.S. Pat. No. 4,100,257 (1978). Preferably, temperatures will range from 10° C. to 80° C., and pressures will preferably range from 1 atmosphere to 100 atmospheres. The $CO_2$ absorption is preferably conducted as a cyclic process in which the $CO_2$-"loaded" absorbent is regenerated or stripped, the "lean" absorbent being returned for use, and the $CO_2$ being recovered or vented.

Off-gases from the bulk $H_2S$ absorption-regeneration procedure are preferably oxidized to produce sulfur. The liberated $H_2S$ is preferably treated by that process known as the "Claus" process. In the "Claus" process, elemental sulfur is prepared by partial oxidation of the $H_2S$ to sulfur dioxide, using an oxygen-containing gas (including pure oxygen), followed by the reaction of the sulfur dioxide with the remaining part of the hydrogen sulfide, in the presence of a catalyst. This process, which is used frequently at refineries, and also for the workup of hydrogen sulfide recovered from natural gas, it carried out in a plant which typically comprises a combustion chamber followed by one or more catalyst beds between which are arranged one or more condensers in which the reaction products are cooled and the separated liquid elemental sulfur is recovered. To some extent, the amount of elemental sulfur recovered depends on the number of catalyst beds employed in the Claus process. In principle, 98% of the total sulfur available can be recovered when three beds are used.

Since the yield of recovered elemental sulfur, relative to the hydrogen sulfide introduced, is not quantitative, a certain amount of unreacted hydrogen sulfide and sulfur dioxide remains in the Claus off-gases. These gases may be incinerated in a furnace or treated in other ways known to those skilled in the art.

In order to describe the invention with greater particularity, reference is made to the accompanying schematic drawing. The drawing is a simplified diagram illustrating process steps of the invention and their integration in a process flow scheme. Incidental elements, such as pumps, valves, tanks, etc., are not shown. All values are merely exemplary or calculated, and should not be taken as delimiting the invention.

As shown, a gas stream containing 2 percent $H_2S$, 5 percent $CO_2$, 48 percent CO and 35 percent $H_2$ (all by volume), enters absorber or contactor (1) via line (2). Absorber (1) is a tray contactor, although any suitable contacting device (such as venturi) may be employed. An absorbent mixture, e.g., a mixture comprising 45 percent by volume of water and 55 percent by volume of sulfolane, enters contactor (1) via line (3). For illustrative purposes, it will be assumed that the gaseous stream enters at 200 MSCF per hour, while the absorbent mixture enters at 20M gallons per hour. Pressure of the gas in line (2) is 100 PSIG, and the temperature of 45° C. The countercurrent flow of liquid and gas, as illustrated, provides for good contact and absorption of the $H_2S$ in the stream. Approximately 97 percent by weight of the $H_2S$ in the stream is absorbed, and the partially purified gas is removed overhead via line (4).

The $H_2S$-containing ("loaded") absorbent exits absorber (1) via line (5), and passes to stripping or regeneration column (6) wherein the $H_2S$ is stripped from the absorbent, preferably by heat supplied as steam. "Lean" absorbent is returned via line (3) for re-utilization in absorber (1) while $H_2S$ is removed via line (7). The $H_2S$ in line (7) may be treated in any suitable fashion, but is preferably sent to a Claus unit. If $CO_2$ has been absorbed to any extent, provision may also be made for its removal or recovery.

Upon exit from contactor (1), the gas stream, which has a substantially reduced H$_2$S content, passes via line (4) to reactor or contact zone (8) wherein it is contacted with water supplied via line (9) and with a catalyst containing Fe/Cr on activated alumina. The gas in line (4) is preferably heat exchanged with the exit gas in line (10) before entry into reactor (8). The temperature of the exit of reactor (8) is about 300° C., pressure about 1000 psig, and total contact time in zone (8) is 2 seconds. In this illustration, sufficient water, as vapor, is supplied in a ratio of 0.3 mols per mol of CO in the gas stream. More or less water may be supplied, the determining factor being the degree of conversion desired. If the COS in the original stream has not been absorbed by the absorbent in contactor (1), or if some remains in the gas stream in line (4), it may be hydrolyzed also in zone (8) to some degree. An optional COS hydrolysis zone (11) is shown (dotted lines) in line (10), the outlet line from zone (8). Suitable catalysts and conditions for such removal as described; supra; see also the aforementioned U.S. Pat. No. 4,409,199.

In accordance with the invention, the gas stream, containing the modified gas stream, and possible COS hydrolysis products, passes via line (10) to contactor (12) where it is contacted with an aqueous reactant solution to produce sulfur. Contactor (12) is a tray contactor, although any suitable contacting device (such as a venturi) may be employed. An aqueous oxidizing reactant solution, e.g., a solution containing 0.4 molar of the Fe(III) chelate of nitrilotriacetic acid, enters contactor (12) via line (13). The gaseous stream enters at 225 MSCF per hour, while the reactant solution enters at 400 gallons per hour. Pressure of the gas in line (10) is 800 PSIG, and the temperature of the gas, having exchanged heat with line (4), is 50° C. Reactant solution is supplied at a temperature of 40° C. The countercurrent flow of liquid and gas, as illustrated, provides for good contact and reaction of the H$_2$S in the stream to sulfur. As will be understood by those skilled in the art, water and the Fe(II) complex or chelate of nitrilotriacetic acid are also produced by the reaction.

Upon exit from contactor (12), the modified gas stream, which is now substantially free of H$_2$S, passes through line (14) to absorption zone (15), as more fully described hereinafter. Concomitantly, reactant mixture, containing some Fe(III) chelate of nitrilotriacetic acid and sulfur, is forwarded via line (16) to regeneration zone (17). As shown in dotted line boxes, the sulfur may be removed prior to regeneration or after regeneration. Preferably, sulfur is removed before regeneration.

In regenerator (17), oxygen is supplied, as shown in molar excess. Preferably, the oxygen is supplied as air, in a ratio of about 2.0 or greater per mole of Fe(II) chelate in the mixture. Temperature of the mixture is preferably around 40° C., and pressure is suitably 20 to 30 psig. Regeneration in this manner has the added advantage of removing some water vapor, thus aiding in prevention of water build-up in the system and reducing bleed and make-up problems. It is not necessary that all of the Fe(II) chelate be converted.

Regenerated absorbent mixture, i.e., an absorbent mixture in which at least the bulk of the Fe(II) chelate has been converted to the Fe(III) chelate, is removed via line (13) and returned to contactor (12).

Any suitable absorbent for removing CO$_2$ from the H$_2$/CO mixture in the stream may be employed in absorber (15). For example, aqueous diisopropaanolamine/sulfolane mixtures may be employed. Suitable CO$_2$ absorption removal procedures and conditions are known to those skilled in the art, and form no part of the present invention. Suitably, the CO$_2$ removal procedure is conducted with a regenerable absorbent, the desired modified stream being removed via line (18), and the loaded absorbent being removed for regeneration via line (19).

While the invention has been illustrated with particular apparatus, those skilled in the art will appreciate that, except where specified, other equivalent or analogous units may be employed. The term "zone," as employed in the specification and claims, includes, where suitable, the use of segmented equipment operated in series, or the division of one unit into multiple units because of size constraints, etc. For example, an absorption column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed, e.g., the oxidizing reactant solutions, may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which may be beneficial.

What is claimed is:

1. A process comprising
(a) contacting a gaseous stream containing H$_2$, CO, and H$_2$S with an H$_2$S-selective absorbent in an absorption zone and absorbing the bulk of the H$_2$S in said stream, producing a partially purified gas stream with water and;
(b) contacting at least a portion of the purified gas stream with a water shift catalyst under conditions to react CO and water in a conversion zone and converting CO and water to H$_2$ and CO$_2$, and producing a modified gas stream having increased ratio of H$_2$ to CO and a minor portion of H$_2$S;
(c) passing modified gas stream to a contacting zone, and contacting modified gas stream in the contacting zone with an aqueous reactant solution, the solution containing an effective amount of an oxidizing polyvalent metal chelate of nitrilotriacetic acid, and mixtures thereof, and converting H$_2$S in the modified gas stream in the contacting zone to sulfur and recovering a substantially sulfur-free gas modified stream having an increased ratio of H$_2$ to CO.

2. The process of claim 1 wherein substantially sulfur-free modified stream is passed to an absorption zone containing an absorbent selective for CO$_2$, CO$_2$ is absorbed, and a gas stream comprising H$_2$ having substantially reduced CO$_2$ content is produced.

3. The method of claim 2 wherein CO$_2$ is recovered.

4. The process of claim 2 wherein the oxidizing reactant is the iron III chelate of nitrilotriacetic acid.

5. The process of claim 3 wherein the oxidizing reactant is the iron III chelate of nitrilotriacetic acid.

6. The process of claim 4 wherein modified gas stream produced in step (b), prior to passing to step (c), is contacted with a COS hydrolysis catalyst under conditions to hydrolyze COS.

7. The process of claim 5 wherein modified gas stream produced in step (b), prior to passing to step (c), is contacted with a COS hydrolysis catalyst under conditions to hydrolyze COS.

* * * * *